W. P. FAULKNER.
AUTOMOBILE LOCKING DEVICE.
APPLICATION FILED SEPT. 27, 1920.

1,424,454.

Patented Aug. 1, 1922.

INVENTOR.
William P. Faulkner.
By M. E. Gillham.
Attorney.

UNITED STATES PATENT OFFICE.

WILLIAM P. FAULKNER, OF KANSAS CITY, MISSOURI.

AUTOMOBILE LOCKING DEVICE.

1,424,454.

Specification of Letters Patent.   Patented Aug. 1, 1922.

Application filed September 27, 1920. Serial No. 413,044.

*To all whom it may concern:*

Be it known that I, WILLIAM P. FAULKNER, a citizen of the United States, residing at Kansas City, in the county of Jackson and State of Missouri, have invented a new and useful Automobile Locking Device, of which the following is a specification.

My invention relates to automobile locking devices and particularly to a device of this character having facility for holding the front wheels of an automobile at an angle to render inoperative the steering rigging.

It is my experience that automobile locking devices, very generally, are applied on operating units, such as clutch, transmission, and other operating parts, thereby leaving the car wheels responsive to the steering rigging should the locked unit be released. The object of my invention is to provide a cheap, durable, and portable locking device which may be readily applied on the front axle and function to detain the traction wheels associated with the axle, at any angle less than a right angle and, thereby, prevent the steering of the car except in a circle.

Figure 1:
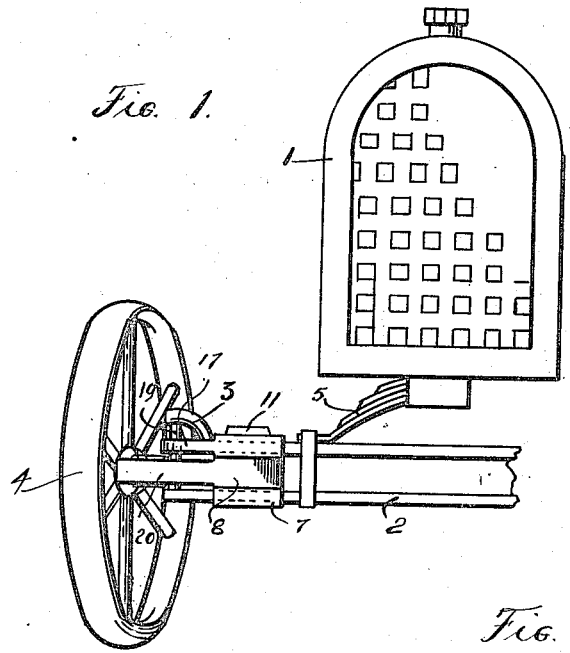
Figure 3:
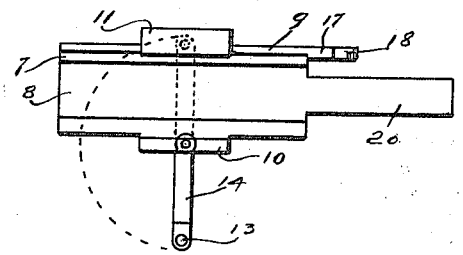
Figure 2:
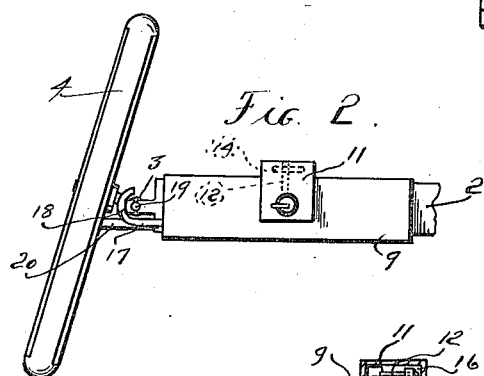
Figure 4:
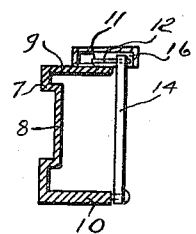

I attain this object and other advantages by means of the mechanism illustrated in the accompanying drawing in which—Figure 1, is a front elevation of my invention, and showing the same applied on the axle of an automobile. Figure 2, is a top view of the same, minus the radiator. Figure 3, is a rear elevation of the device apart from the car axle, and showing the means for locking the same on the latter, and Figure 4, is a cross section of the device.

Similar numerals of reference refer to corresponding parts throughout the several views.

On the drawing, the numeral 1, designates the radiator front of an automobile having the customary I-beam axle 2, knuckle joint 3, front wheel 4, the body spring 5.

The device consists of angle plates having a vertical side 7, which is depressed longitudinally to form a supporting portion 8, adapted for fitting in the channel of the axle and, thereby, hold the device in place. The horizontal plate 9, is wide enough to correspond with the width of the axle. A strip 10, is formed integral with the lower edge of the side plate 7, centrally thereof, and is arranged to project under the axle, transversely thereof. The strip is preferably made a little thicker, for a purpose that will presently appear. A lock 11, is mounted in a substantial and suitable manner on the plate 9, and approximately in the middle thereof, and the lock is provided with a bolt 12, which is so arranged that it shall enter an eye 13, in the free end of a latch 14, which is pivotally mounted on the edge of the strip 10, the latch being thereby adapted for turning on its pivot and present its eye to receive the bolt 12. A portal 16, is provided at the overhanging portion of the lock proper, directly in the rotative field of the latch. A finger extension 17, is arranged to project longitudinally of the device a suitable distance and the end portion of the finger is provided with a hook 18, which is for engaging the pivot pin 19, of the knuckle joint 3, and thereby prevent inward lateral movement of the device. A finger extension 20 of the depressed portion of the plate 7, is extended longitudinally outward of the device a suitable distance to impinge upon the inner side of the wheel when the latter is steered to the right or left at an angle less than a right angle. A key is provided for the lock, not shown.

The device is made of metal suitable for the purpose, and is designed to be portable, so that it may be carried as part of the equipment of an automobile, and applied on the front axle to prevent theft of the car during the absence of the driver.

When a stop is made, the front wheels of the car are generally steered to the right so that one of them is against the street curbing or other obstruction. In this position the device is applied on the axle adjacent the wheel at the curb, by first placing the hook of the finger 17, about the pivot pin 19, of the knuckle joint and then swinging the device to place on the axle and, thereafter, securing the device thereon, by rotating the latch 14, upward, so that the free end thereof shall enter the portal 16, of the lock, and then shooting the bolt 12, with the lock key into the eye in the latch. The finger 20, is thus brought to bear on the inner side of the deflected wheel, thereby preventing the steering thereof back to a straight course. It is obvious that the inability to steer the car in a straight course prevents the theft thereof, since the wheel is held by the finger 20, at an angle calculated to hold the running car to a circuitous route. The prominence and stability of the device makes tampering therewith to release the wheel a slow, and laborious proceeding, and the use of force gives audible warning of the attempt.

Having described my invention what I claim is—

The combination with the front axle, the steering knuckle, and the front bearing wheel of an automobile, of a stop member demountably secured on the axle and arranged thereon to hold the bearing wheel deflected, said stop member comprising a channel plate having its vertical side inset longitudinally to thereby form a boss adapted for occupying the channel in the axle and permit the upper and lower sides of the channel plate to receive between them and the boss the axle, the outer end of the boss having an extension extending to and against the bearing wheel when the latter is deflected, the outer end of the upper side of the channel plate having a horizontally extending hook adapted for catching the pivot on the steering knuckle, a locking device mounted on the upper side of the channel plate and projecting therefrom, and a locking bar pivotally mounted on the lower side of the channel plate and having a hole in its free end portion adapted for receiving the bolt of the locking device.

Dated, Kansas City, Missouri, September 23, 1920.

WILLIAM P. FAULKNER.

Witnesses:
BATTLE McCARDLE,
ELIAS BERELL.